Aug. 19, 1958     H. W. COLE, JR     2,848,570
HIGH SPEED ROTARY ELECTRIC SWITCH
Filed June 4, 1954     3 Sheets-Sheet 1
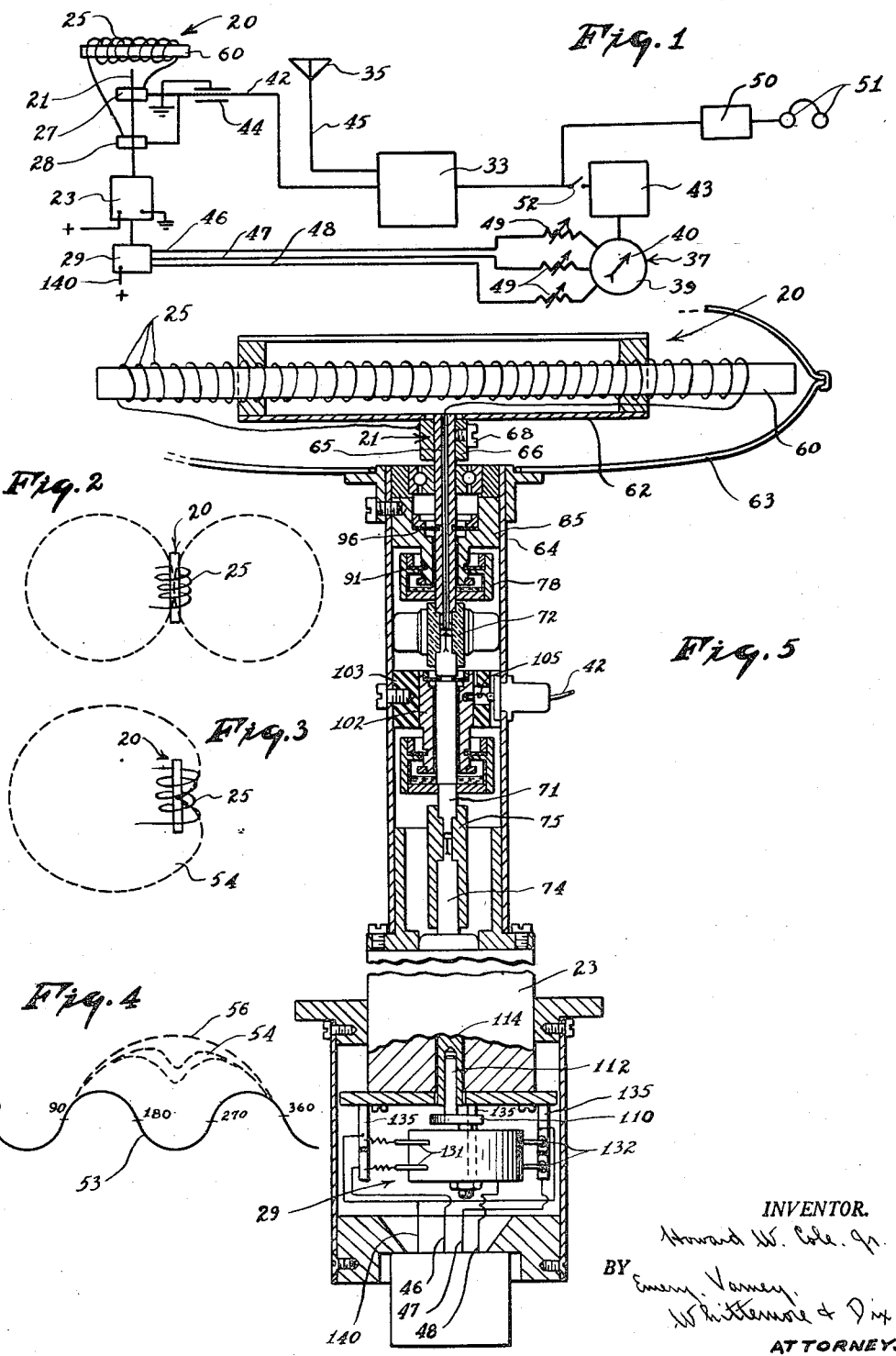
INVENTOR.
Howard W. Cole, Jr.
BY Emery, Varney,
Whittemore & Dix
ATTORNEYS Aug. 19, 1958
H. W. COLE, JR
2,848,570
HIGH SPEED ROTARY ELECTRIC SWITCH
Filed June 4, 1954
3 Sheets-Sheet 2
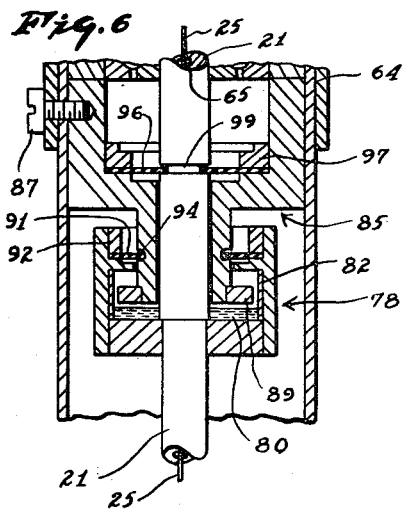
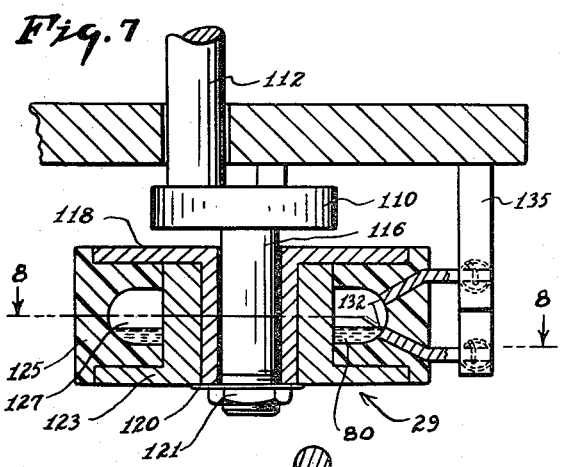
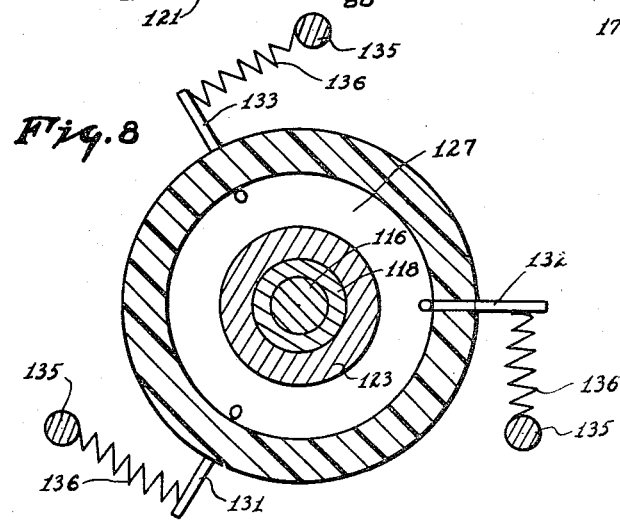
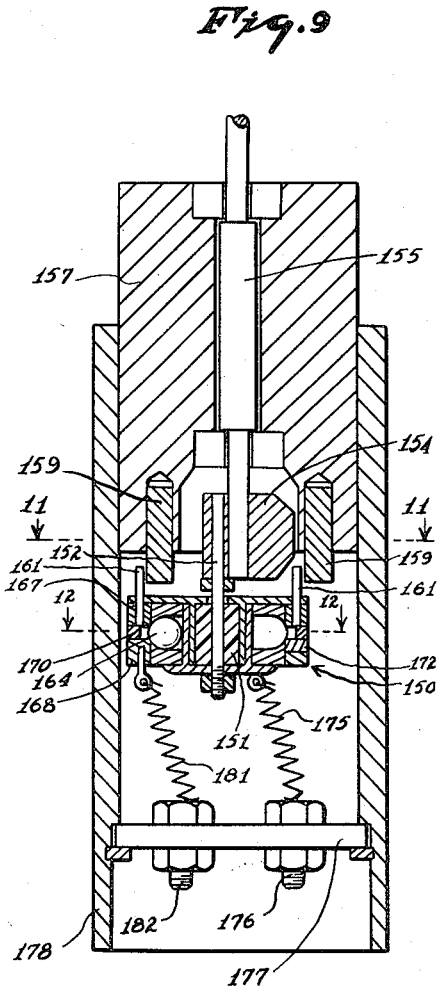
INVENTOR.
Howard W. Cole, Jr.
BY
ATTORNEYS

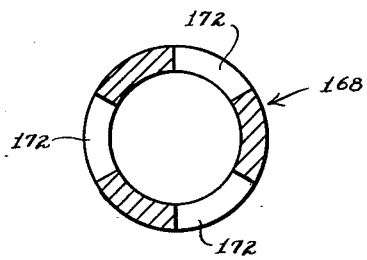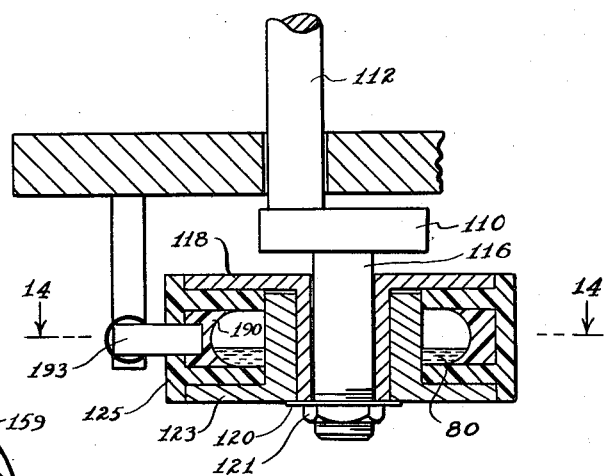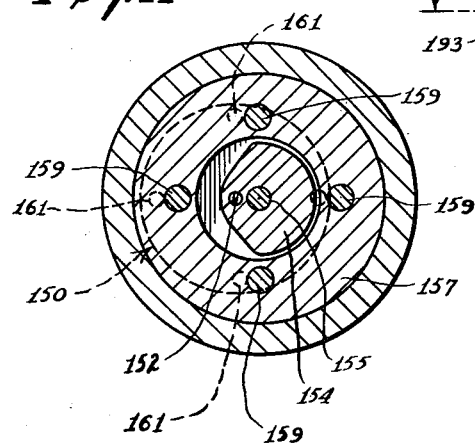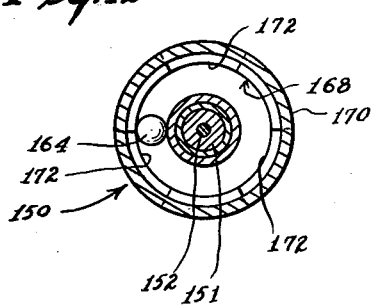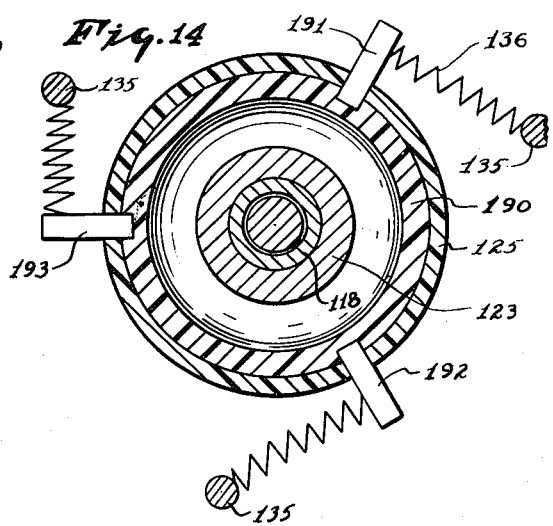

United States Patent Office 2,848,570
Patented Aug. 19, 1958

2,848,570

HIGH SPEED ROTARY ELECTRIC SWITCH

Howard W. Cole, Jr., Mountain Lakes, N. J.

Application June 4, 1954, Serial No. 434,571

8 Claims. (Cl. 200—32)

This invention relates to automatic direction finders such as are used for radio navigation.

It is an object of the invention to provide an improved automatic direction finder which is of simple and inexpensive construction and which can be used with a conventional radio receiver in an airplane, or other location, thus eliminating the necessity for the usual electronic equipment required for direction finders.

Another object of the invention is to provide an automatic direction finder which operates on the maximum signal strength, or a maximum of signal strength which is averaged over a predetermined period, as compared to null balance direction finders of the prior art.

In its preferred construction, the invention includes a revolving loop antenna which supplies signals to the input of a conventional radio, with the antenna of the radio utilized as a sense antenna, and a direction indicator including a single-phase rotor and a field supplied with power from a polyphase generator running in timed relation with the loop.

Another object is to provide a combination of an automatic direction finder with a conventional radio receiver and in which the radio receiver can be used for audio reception at the same time that it is being used as a part of the automatic direction finder operating means. The radio serves as a radio frequency amplifier and detector.

The direction finder of this invention has a bearing accuracy of approximately plus or minus one degree, and it is not appreciably affected by distance from the station. Any signal that is recognizable by monitoring the radio receiver will provide accurate readings for the direction finder.

The invention is not affected by either altitude changes in the aircraft or the approach angle of the radio signal. This is an important advantage when the aircraft is flying over the station from which the signal comes. The direction finder of this invention is sensitive only to vertically polarized signals and does not recognize horizontal polarization components of the signal. Therefore, it is not subject to polarization errors, or sky or night effects, which are caused by action of the ionosphere.

Quadrantial compensation is accomplished by electrical means. There are no mechanical cams, on either the antenna or the indicator, to be adjusted or to increase the friction of the system with a resulting decrease in overall accuracy. The slip rings and field generator are of special construction to obtain minimum friction, and it may be said to be another object of the invention to provide an automatic direction finder which has a rotating loop antenna with slip rings and a field generator that have substantially less friction than direction finders of the prior art.

The direction finder of this invention operates equally well with modulated carrier signals or pulsed carrier signals. There will be no indication in the complete absence of signal, of course, but experience has shown that satisfactory operation is obtained with a ratio of only 20 to 30% of "on time" to "off time." Any number of indicator units can be operated simultaneously with the same system. The only requirement is sufficient power output capacity of the receiver. A separate power amplifier can be used for each additional indicator.

Other features of the invention relate to an improved slip ring construction; and to a rotary switch which functions as a polyphase generator, and as a three-phase generator in the construction illustrated.

Other objects, features and advantages of the invention will appear or be pointed out as the description proceeds.

In the drawing, forming a part hereof, in which like reference characters indicate corresponding parts in all the views:

Figure 1 is a diagrammatic view showing the component parts of the automatic direction finder of this invention and their relation to one another;

Figures 2, 3 and 4 are diagrams illustrating a part of the principle of operation of the invention;

Figure 5 is a fragmentary elevation, mostly broken away and in section, of the loop antenna, slip rings, motor and three-phase generator of the direction finder combination shown in Figure 1;

Figure 6 is a greatly enlarged view of one of the slip rings of Figure 5 but with a somewhat different type of seal;

Figure 7 is a greatly enlarged sectional view of the three-phase generator shown in Figure 5;

Figure 8 is a sectional view taken on the line 8—8 of Figure 7;

Figure 9 is a vertical sectional view through a switch having a modified construction from that shown in Figures 7 and 8;

Figures 10, 11 and 12 are sectional views taken on the lines 10—10, 11—11 and 12—12, respectively, of Figure 9;

Figure 13 is a sectional view, similar to Figure 7, but showing a third modification of the construction of the switch used for providing a three-phase rotating field for the indicator; and Figure 14 is a sectional view on the line 14—14 of Figure 13.

Figure 1 shows the automatic direction finder made in three units. The first unit of the system consists of a loop antenna 20 carried at the upper end of the shaft 21 which is rotated at a substantially constant speed by a motor 23. The opposite ends of a winding 25, of the loop antenna 20, are connected with slip rings 27 and 28 on the shaft 21. This antenna unit also includes a three-phase generator 29 driven by the motor 23 at the same speed of rotation as the loop antenna 20.

The second unit of the system consists of a conventional radio receiver 33 having an antenna 35. The third unit of the system is a synchro indicator 37 having a dial 39 and a pointer 40 which moves around the face of the dial in accordance with changes in the direction from which the signal comes. If necessary, a power amplifier 43 can be used to strengthen the signal supplied by the radio receiver 33 to the indicator 37. An equivalent combination is one having an oscillator in place of the amplifier 43 with the radio signal used to trigger the oscillator.

The signal from the slip ring 27 travels through a conductor 42, having shielding 44 which is indicated only diagrammatically in Figure 1, to the input side of the radio receiver 33. Signals from the antenna 35 are led in through a conductor 45 to the input side of the radio receiver 33.

The indicator 37 has a rotating field, preferably a field winding having three coils connected with the three-phase generator 29 by conductors 46, 47 and 48 leading to the different coils of the winding.

The directional bearing obtained by a direction finder is in the direction in which the radio wave passes the antenna. When the antenna is close to any other structure, as it is in conventional aircraft installations, the passing wave is bent or deflected by the structures so that the directional bearing is in error. Therefore, some means for calibrating the direction finder must be provided. One method of providing such compensation is through the use of a cam control for the indicator pointer. Obviously this introduces a considerable amount of friction into the indicator which affects the accuracy that can be obtained.

With this invention quadrantial compensation is obtained by inserting variable resistors 49 in series with each coil of the field windings of the indicator. Adjustment of these three resistors 49 distorts or unbalances the rotating field within the indicator so that the indicator pointer shows a bearing of more or less degrees than the radio wave bearing actually passing the antenna. Thus the direction finder is made to accurately show a true bearing, regardless of the horizontal attitude of the aircraft with respect to the transmitting station. This means of electrical compensation allows the indicator to be practically friction free.

Since the alternating current output of the radio receiver 33, resulting from the rotation of the loop antenna 25, is of very low frequency (approximately fifteen C. P. S.), a low frequency filter 50 in the audio output of the receiver to speakers 51 will practically eliminate these signals and retain the audio information nearly unimpaired. Thus the receiver can be used for communication even while the automatic direction finder is in operation. A simple switch 52 can be used to shift from direction finder operation to normal receiver operation.

Theoretically, assuming a frictionless indicator movement, there will be as high an accuracy at the extreme reception range of the receiver as there is close to the transmitting station. In practice, this is obviously unobtainable, but the nature of the armature current, particularly under conditions of voice modulation, produce a mild armature dither which is useful in decreasing the armature friction. It is evident that at some range, depending upon the radio receiver used, there is insufficient armature current for accurate operation of the direction finder. Therefore, there is incorporated into the circuit the auxiliary amplifier 43 which includes a signal limiting device and an indicating neon tube. At short range, the armature current is limited to prevent over-driving and saturating of the indicator or coupling transformers, while at long range, the neon tube will show that there is sufficient armature current for high accuracy operation. Thus by maintaining a constant armature current over the range of reception, a constant bearing accuracy can be obtained.

The operation of the automatic direction finder of this invention is relatively unaffected by the type of signal received. The only requirement is that the modulation of carrier pulses be of a random nature with respect to the rotational speed of the loop antenna. The averaging characteristic of the indicator provides a steady reading. Of course there will not be any operation of the direction finder during periods of zero signal as between messages, but the ratio of the off time can be as low as twenty to thirty percent and still provide sufficient signal for operation of the direction finder.

Figure 2 is a diagrammatic view showing the field strength around the antenna 20 when unmodified by a signal from a sense antenna. As the antenna 20 in Figure 2 rotates, it will produce a signal having two maximal and two minimal points for each rotation. This variation in signal strength is represented by the signal line 53 in Figure 4.

By means of mutual inductive coupling at the rotating antenna 20 and the sense antenna 35 to the radio frequency coil at the receiver 33, the sense antenna signal is shifted 90 degrees in phase with respect to the loop antenna signal so that the combined input to the radio receiver becomes a carrier-modulated signal preferably with only one maximal and one minimal point, although the ratio of loop to sense signal is not important and may vary over a fairly wide range.

Curves 54 and 56 of Figure 4 illustrate two ratios of sense signal level to rotating antenna signal level. Curve 54 showing a condition where the sense signal is less than the rotating antenna level. Curve 56 showing a condition where the sense signal either exactly equals or exceeds the rotating antenna signal. The field strength pattern illustrated in Figure 3 is a condition of equal signal levels.

It is preferable that this invention be operated under conditions of signal pattern 56 although completely satisfactory operation will be obtained with any ratio of sense signal to rotating antenna signal illustrated by curves 54 and 56.

The audio output of the receiver is an alternating current voltage with the fundamental frequency equal to the rotational speed of the loop antenna. This voltage is applied to the armature of the synchro-type-indicator 37. The phase of this voltage with respect to the rotating stator field, produced by the directly coupled three-phase generator 29, is determined solely by the direction of the arriving signal to the antennas. Thus the indicator armature will be positioned in accordance with this phase relationship.

As a result of the mass and inertia of the indicator armature, its position is a result of the average of the armature current for one cycle of antenna rotation. This explains why an exact balance between a sense antenna signal and loop antenna signal antenna is not necessary. Similarly, the average characteristic of the indicator armature provides operation even under severe atmospheric noise, such as electrical storms, as such noise is of a random nature and relatively short-duration.

Figure 5 shows the loop antena 20 which indicates a ferramic rod 60 around which is wrapped the winding 25 of the loop antenna. This rod 60 is protected by being encased, throughout most of its length, by a sleeve, such as an aluminum tube 62. There is a slot through the top wall of the sleeve or tube 62 so that it will not act as a short circuited winding. The antenna 20 is completely enclosed in a disc-shaped housing 63 connected with the upper end of a vertically extending tubular housing 64.

In the preferred construction the rod and winding 25 are matched to the resistance of the transmission line conductor 42 and operates as an untuned loop. The loop is mechanically attached to the drive shaft 21 so as to rotate as a unit therewith. The speed of rotation is not a criteria of the direction finder operation.

One end of the winding 25 is led downwardly through an axial bore 65 in the shaft 21. The sleeve 62 is rigidly attached to a hub 66 which fits snugly over the upper end of the shaft 21. A set screw 68 holds the hub 66 securely fixed in any selected angular position around the axis of the shaft 21.

The shaft 21 is of composite construction. It has a mid section 71 connected to the upper section by an insulating sleeve 72. It also has a lower section 74 connected with the mid section by an insulating sleeve 75. The section 74 may be the armature shaft of the motor 23. If not, it is directly driven by the motor 23, and the connections 72 and 75 are rigid connections which cause all parts of the shaft 21 to rotate as a unit.

The winding 25, which is led downwardly through the bore 65, connects with the mid portion 71 of the loop antenna drive shaft. A slip ring is connected with this mid section 71 for taking off signals to the conductor 42, and another slip ring located around the upper section of the shaft 21 provides the ground connection for the loop antenna.

Figure 6 shows the construction of one of the slip rings.

A metal cup 78 is secured to the upper section of the antenna drive shaft 21. This cup encloses a chamber containing a quantity of mercury 80. As the entire cup 78 is not made of mercury wettable material, a lining 82 of such material is provided on the inside wall of the chamber. Brass is a suitable material for the lining; so are nickel, gold and silver. A platinum radium alloy is preferable.

A fixed slip ring element 85 fits within a housing 64 and is secured to the housing by a set screw 87. The fixed slip ring element 85 has a lower portion extending into the cup 78 and there is a collar 89 on the lower end of the element 85 made of mercury wettable material.

When the shaft 21 rotates, the cup 78 rotates as a unit with it; and the mercury 80 is moved by centrifugal force toward the lining 82. This mercury bridges the gap between the lining 82 and the collar 89, thus establishing an electrical circuit from the shaft 21, through the cup 78, lining 82, mercury 80, collar 89, and fixed slip ring element 85, to the housing 64 which is grounded.

When the cup 78 is rotating at the intended speed of rotation of the loop, the centrifugal force is sufficient to hold the mercury in its circuit-closing position, regardless of inversion or other changes in orientation of the entire assembly.

In order to prevent the mercury 80 from leaking out of the cup 79, if the equipment is inverted when not rotating, there are seals between the slip ring elements 78 and 85, and between the fixed slip ring element 85 and the shaft 21. The first of these seals is a plastic ring or disc 91 secured to the cup by a retaining ring 92 and having its inner edge portion extending into a circumferential groove 94 in the shaft 21. While this sealing disc preferably has a clearance from the sides of the groove 94 at all points, so as to avoid friction, it is pliant enough to contact with the side of the groove 94 if any mercury falls into contact with the disc 91 when the apparatus is inverted.

Another sealing ring or disc 96, similar to the disc 91, is secured to the fixed slip ring element 85 by a retaining ring 97, and this sealing disc 96 extends into a circumferential groove 99 in the shaft for sealing the apparatus against the escape of mercury which may flow down through the clearance between the stator element 85 and the shaft 21 when the apparatus is inverted.

Referring again to Figure 5, the slip ring assembly which surrounds the mid section 71 of the loop antenna drive shaft 21 is similar to the upper slip ring already described, except that it has a fixed slip ring element 102 which is rigidly held in position by a bushing 103, and this bushing insulates the slip ring element 102 from the housing 64. The electrical circuit from the fixed slip ring element 102, to the conductor 42, is completed through a connector 105 which is secured at one end to the slip ring element 102 and at the other end to the conductor 42.

Figure 7 shows the inside construction of the three-phase power source 29 which includes a disc 110 having an eccentric stud 112 secured to the armature shaft 114 of the motor 23. An axle 116 extends downwardly from the disc 110. A generator hub 118 fits over the axle 116 and has a running clearance for the axle. The hub 118 is held on the axle 116 by retaining means, such as a washer 120 and a nut 121. A bushing 123 fits over the hub 118 and has a flange which clamps an outer ring 125 against a complementary flange on the hub 118. An annular groove 127, in the inside face of the ring 125, provides a chamber for mercury 80. The outer ring 125 is made of insulating material.

At angularly spaced regions around the outer ring 125, there are pairs of conductors 131, 132 and 133 extending through the outer ring 125. In the construction shown, these pairs of conductors 131 are shown with 120 degree angular spacing from one another around the chamber 127. Both of the conductors of the various pairs of conductors 131, 132 and 133 are connected with a post 135 by a flexible conductor 136 which also serves as resilient restraining device for preventing rotation of the generator 29 about the axis of the axle 116.

Referring again to Figure 7, when the apparatus is in operation, the shaft 112 rotates as a unit with the loop antenna drive shaft end and imparts an orbital movement to the axle 116 about the axis of rotation of the shaft 112. The hub 118, and its connecting elements, then rotate; but they have the same orbital movement as the axle 116 which rotates in the hub 118. This orbital movement produces a centrifugal force that moves the mercury 80 against the side wall of the chamber 127 so that the mercury bridges the space between the upper and lower conductors of the pair of conductors 131, and between other conductors of the other pairs of conductors 132 and 133 as the mercury travels around the chamber 127. It will be evident that the mercury 80 will always move into the part of the chamber 127 which is farthest from the axis of orbital movement, and since the chamber in which the mercury is enclosed does not rotate during its orbital movement, the mercury rotates with respect to the chamber.

In the preferred construction, there is enough mercury 80 in the chamber 127, to cover an angular extent of approximately 110 degrees. All of the upper contacts of the contact pairs 131, 132 and 133 are connected with a common power source through a conductor 140, and the lower contact, of the pair of contacts 131, is connected with the conductor 46 leading to the indicator. Similarly, the lower contacts 132 and 133 are connected with the conductors 47 and 48, respectively, which lead to the stator windings of the indicator. There are preferably three coils in the stator windings, each connected with a different one of the conductors 46, 47 and 48.

The compact switch of this invention which serves to generate the three-phase power for the indicator is primarily responsible for the low weight and small size of the direction finder of this invention. This switch operates well with a twenty-four volt battery as a source of power. Experience has shown that the switch has exceptionally long life, extremely high contact current capacity and a speed range of from 50 to over 10,000 revolutions per minute. Its very low driving torque (only the bearing friction) allows use of a very small and light driving motor, the switch is insensitive to changes in orientation at speeds above 50 revolutions per minute.

Figure 9 shows a modified form of switch for obtaining a multi-phase current supply for the indicator. In this construction the switch proper includes a composite housing 150 with a center bushing 151 through which an axle 152 extends. This axle 152 is connected with a rotary element 154 at the lower end of a drive shaft 155. The axle 152 extends in a direction parallel to the axis of rotation of the drive shaft 155 but it is spaced from this axis so that it describes an orbital movement around the axis of the drive shaft 155.

The drive shaft 155 extends through a stationary housing 157 from which studs 159 project downwardly toward the switch housing 150. In the construction illustrated there are four studs 159 and they are angularly spaced from one another by ninety degrees.

There are a number of small rigid pins 161 extending upwardly from the top of the housing 150 of the switch. Each of the pins 161 is located immediately adjacent to one of the studs 159, and each pin 161 is in the same position around the circumference of its adjacent stud 159 as are the other pins 161. This relation is shown in Figure 11. The purpose of the studs 159 and the pins 161 is to prevent the switch housing from rotating about the axle 152. For any position of the switch housing 150 around its orbit, there is always one or more of the pins 161 which is in position to strike against its immediately adjacent stud 159 to prevent rotation of the switch housing 150 about its axle 152.

As the switch housing 150 travels with its orbital movement around the axis of rotation of the drive shaft 155, the pins 161 travel in orbits around the longitudinal axes of the studs 159. In order to obtain this result, it is necessary that the center-to-center distance of the pins 169 from their respective studs 159 be the same as the center-to-center distance of the axis of the axle 152 from the axis of rotation of the drive shaft 155.

Within the switch housing 150 there is an annular chamber which serves as a race-way for a ball 164. The housing 150 is made of electrical insulating material except for two rings 167 and 168. The ring 167 forms the upper portion of the outer limit of the race-way in which the ball 164 rotates. The lower ring 168 forms the lower portion of the wall of the race-way in which the ball 164 travels. These rings 167 and 168 are insulated from one another by a gasket 170.

The lower ring 168 has angularly extending recesses into which segments of insulating material are inserted. These insulating segments, indicated by the reference 172 divide the lower ring 168 into alternate conducting and non-conducting segments, as shown in Figure 10.

Referring again to Figure 9, the ball 164 rolls against both the upper ring 167 and the lower ring 168 when it is forced outwardly by centrifugal force during the orbital movement of the housing 150 around the axis of rotation of the drive shaft 155. The ball 164, which is preferably made of hard silver alloy, establishes an electric circuit between the upper ring 167 and the lower ring 168 during the time that the ball is on the metal segments of the ring 168 between the insulation segments 172.

With the alternating conducting and insulating segments shown in Figure 10, each of which extends for a distance of sixty degrees, the switch will conduct electricity for sixty degrees of angular movement of the ball, will be non-conducting for the next sixty degrees of movement and then again conducting for the following sixty degrees, etc., around the entire circumference of the ring 168.

The upper ring 167 is connected through portions of the frame of the switch housing 150 to a flexible conductor 175 which connects with a binding post 176 on a partition 177 at the lower end of a tubular housing 178 which surrounds the switch 150. One conducting segment of the lower ring 168 is connected, by a flexible conductor 181, with a binding post 182 carried by the partition 177. The other conductor segments of the lower ring 168 are connected ot similar conductors leading to binding posts which are connected to the different coils in the three-phase field windings of the direction indicator.

In place of the ball 164, a quantity of mercury can be used within the switch housing 150, but the ball 164 has the advantage that it can be used in switches subject to extremely low temperatures where mercury would be unsuitable because of freezing.

Figures 13 and 14 show another modified form of the switch for obtaining a rotating field for the stator of the indicator. This construction, shown in Figures 13 and 14, is generally similar to the construction shown in Figures 7 and 8, except that there is a different relation of the current carrying contacts and a variable resistance in the circuit is used to give a somewhat different shape of voltage curve. The parts in Figures 13 and 14 which correspond to similar parts in the construction shown in Figures 7 and 8 are indicated by the same reference characters as in Figures 7 and 8.

In Figures 13 and 14, the outer ring 125 has a lining 190 which is made of material suitable for an electrical resistor, such as resin bonded carbon.

There are three contact elements 191, 192 and 193 at equal angular spacing around the circumference of the ring 125. The inner ends of these contact elements 191, 192 and 193 do not extend entirely through the radial thickness of the lining 190. Since current passes through the lining 190 to the contact elements 191, 192 and 193, it is unnecessary that these elements extend all the way into the annular chamber in which the mercury 80 is enclosed. The only difference in having these contact elements extend completely through the wall of the lining is that resistance of the switch would be somewhat lower at the time that the mercury is in contact with the respective contact elements.

With the switch structure shown in Figures 13 and 14, some current will flow to all of the contact elements 191, 192 and 193 at all times, but as the mercury mass approaches closer to each of the contact elements the resistance between the mercury and that contact element decreases progressively and reaches a minimum when the mercury mass is in radial alignment with the particular contact element. The minimum resistance is encountered when the mass of mercury is located in the annular chamber in a position symmetrical with respect to a particular contact element 191, 192 or 193.

The switch housing 29 is held against rotation by the conductors 136 located between the posts 135 and the respective contact elements 191, 192 and 193, or by any other suitable means which will not interfere with the orbital movement of the housing.

The preferred embodiment and some modifications of the invention have been illustrated and described, but other changes and modifications can be made and some features can be used in different combinations without departing from the invention as defined in the claims.

What is claimed is:

1. A rotary switch for supplying multi-phase pulses of current to a circuit, said switch comprising a rotatable support with an axle extending in a direction parallel to but offset from the axis of rotation of the support, a housing on the axle and within which the axle is free to turn as it moves the housing with an orbital movement around the axis of rotation of the support, means for preventing rotation of the housing during such orbital movement of the housing, the housing having an annular chamber therein and electrical conductors located at angularly spaced regions around the annular chamber and around the wall of the chamber which is at the outside of the annular space enclosed within the chamber, and an electrical conductor housed within the annular chamber and movable around the annular chamber by centrifugal force as the chamber is moved rapidly around the orbit described by said axle.

2. A rotary switch comprising a rotatable support with an axle extending in a direction parallel to but offset from the axis of rotation of the support, a housing on the axle and within which the axle is free to turn as it moves the housing with an orbital movement around the axis of rotation of the support, means for preventing rotation of the housing during such orbital movement of the housing, the housing having a generally circular chamber therein and electrical conductors located at angularly spaced regions around the annular chamber, an an ambient electrical conductor housed within the generally circular chamber and movable around the generally circular chamber and past the electrical conductors by centrifugal force as the chamber is moved rapidly around the orbit described by said axle.

3. The rotary switch described in claim 2, and in which there is a different terminal on the outside of the housing connected with each of the conductors that are located around the generally circular chamber, and flexible conductors connected to said terminal for connecting said terminals with circuits at fixed locations beyond the housing.

4. The rotary switch described in claim 2, and in which the ambient electrical conductor is a circular metal ball that rolls around the generally circular chamber as the chamber moves about its orbit.

5. The rotary switch described in claim 2, and in which the ambient electrical conductor is a quantity of mercury.

6. A rotary switch comprising a rotatable support with an axle extending in a direction parallel to but offset from the axis of rotation of the support, a housing on the axle and within which the axle is free to turn as it moves the housing with an orbital movement around the axis of rotation of the support, means for preventing rotation of the housing during such orbital movement of the housing, the housing having a generally circular chamber with a wall having upper and lower electrical conductor portions electrically insulated from one another at an intermediate level of the wall, and an ambient electrical conductor that rests in the lower part of the chamber when the housing is stationary and that travels progressively around the circumference of the generally circular chamber in simultaneous contact with both the upper and lower electrical conductor portions of the wall to establish a circuit between them when the housing is moving rapidly about its orbit and subjecting the ambient electrical conductor to a substantial centrifugal force.

7. The rotary electrical switch described in claim 6 and in which the ambient electrical element is a metal ball that rolls within the annular chamber.

8. The rotary switch described in claim 6, and in which the ambient electrical conductor is a quantity of mercury.

References Cited in the file of this patent

UNITED STATES PATENTS

| | | |
|---|---|---|
| 988,571 | Hutton | Apr. 4, 1911 |
| 1,586,993 | Hoeschen | June 1, 1926 |
| 1,900,080 | Snavely | Mar. 7, 1933 |
| 1,937,137 | Barclay | Nov. 28, 1933 |
| 2,151,917 | Hyland | Mar. 28, 1939 |
| 2,183,746 | Hyland | Dec. 19, 1939 |
| 2,241,883 | Klein | May 13, 1941 |
| 2,295,412 | Little | Sept. 8, 1942 |
| 2,609,467 | Winter | Sept. 2, 1952 |
| 2,639,135 | Sloan | May 19, 1953 |
| 2,687,453 | Saxl | Aug. 24, 1954 |